United States Patent

DeLuca et al.

[11] 3,990,998
[45] Nov. 9, 1976

[54] HIGH SURFACE AREA RUTHENIUM BONDING SUPPORTS ON MONOLITHIC CERAMICS

[75] Inventors: John P. DeLuca, New Providence; Gary B. McVicker, Westfield; Lawrence L. Murrell, Elizabeth, all of N.J.

[73] Assignee: Exxon Research and Engineering Company, Linden, N.J.

[22] Filed: June 3, 1975

[21] Appl. No.: 583,508

[52] U.S. Cl. .......................................... 252/466 PT
[51] Int. Cl.$^2$ .......................................... B01J 23/46
[58] Field of Search ............................. 252/466 PT

[56] References Cited
UNITED STATES PATENTS

| | | | |
|---|---|---|---|
| 3,315,008 | 4/1967 | Abell et al. | 252/466 PT X |
| 3,615,166 | 10/1971 | Hindin et al. | 252/466 PT X |
| 3,835,069 | 9/1974 | Gandhi et al. | 252/466 PT X |
| 3,839,224 | 10/1974 | Yonehara et al. | 252/466 PT X |
| 3,850,847 | 11/1974 | Graham et al. | 252/466 PT X |
| 3,880,776 | 4/1975 | Box, Jr. et al. | 252/466 PT |

Primary Examiner—Winston A. Douglas
Assistant Examiner—William G. Wright
Attorney, Agent, or Firm—Joseph J. Allocca

[57] ABSTRACT

The instant invention relates to high surface area multilayered oxide supports coated with ruthenium of the type Ru-MgO-MgAl$_2$O$_4$-MgAl$_2$O$_4$+Mg$_2$SiO$_4$-Core. The system comprises ruthenium on a critical amount of free MgO, i.e., at least 2 wt. % minimum, on prereacted Al$_2$O$_3$ which itself is on a monolithic ceramic substrate. This combination demonstrates the desirable, and previously unachievable characteristic of resistance to ruthenium volatilization and agglomeration, coupled with high catalytic activity. The high surface area oxides (MgO+Al$_2$O$_3$) are strongly bonded to and reacted with the monolithic core substructure so as to possess physical strength. Ruthenium catalyst systems prepared utilizing the supported support (multilayered mixed oxides) method disclosed by the instant invention are useful for the treatment of waste gases, particularly exhaust gases from internal combustion engines and stationary sources and the removal of oxides of nitrogen therefrom.

9 Claims, 1 Drawing Figure

HIGH SURFACE AREA RUTHENIUM BONDING SUPPORTS ON MONOLITHIC CERAMICS

BACKGROUND OF THE INVENTION

Ruthenium catalysts are well known to possess unique efficacy for the catalytic removal of $NO_x$ from the exhaust gases of internal combustion engine and stationary sources while avoiding the production of ammonia. However, a principal drawback to their practical utilization is the tendency of ruthenium to form volatile oxides ($RuO_3$ and $RuO_4$) at high temperatures in the presence of oxygen and/or steam. Such volatilization losses result in large catalytic $NO_x$ removal variations. This tendency is particularly unfortunate in light of the fact that under normal operating conditions, internal combustion engines produce very high temperatures and continuously varying oxygen content gases, depending upon the fuel/air ratio being delivered by the standard carburetor to meet load requirements. Stationary sources tend to produce lean effluent waste streams. Therefore, for any catalyst system used to reduce $NO_x$ to be realistically attractive, it must be characterized by a high and sustained activity, coupled with physical and chemical ruggedness, and pronounced resistance to ruthenium oxide volatilization.

PRIOR ART

Houdry et al in U.S. Pat. No. 2,742,437 espoused the use of a high strength porcelain material substrate coated with a metal oxide. He then taught that this film of metal oxide is impregnated with a catalytically active metal to form a catalyst system. The Houdry et al patent suggests suitable metal oxides as being alumina, thoria, magnesia and beryllia and the catalytic metals as being ruthenium, palladium, platinum, silver, copper, etc. In practice, however, Houdry et al only utilized platinum on alumina on porcelain or platinum on magnesia on porcelain. Furthermore, this patent, while indicating the desirability of high mechanical strength coupled with high and sustained catalytic activity did not demonstrate that these catalytic systems did indeed possess such mechanical strength or catalytic durability characteristics. No demonstration was made as to the catalytic activity or activity maintenance under either actual or simulated operation conditions. Since the catalyst disclosed in Houdry et al is an oxidation catalyst it would be run at high temperatures in the presence of oxygen. A standard ruthenium catalyst run under such conditions would rapidly deteriorate through the loss of ruthenium as $RuO_4$ and $RuO_3$ or by sintering of the catalytic metal. A review of the patent discloses that while a ruthenium catalyst was broadly claimed, it was never tested or utilized.

U.S. Pat. No. 3,705,097 teaches hydrodesulfurization of crude hydrocarbon feed in the presence of a fluidized catalyst containing a Group VIII metal supported on an MgO on $Al_2O_3$ and/or MgO on $SiO_2$ carrier. MgO is present at from 5–25 wt. %. This system is clearly distinguishable from the instant invention in that it deals with a fluidized catalyst system whereas the instant invention teaches a supported support reduction catalyst wherein the presence of free MgO is an essential characteristic of the system.

Foster et al in German Pat. No. 2,317,560 discloses multilayer support coatings which contain an oxide on a mechanical support which in turn is coated with yet another metal oxide selected from the group consisting of Ti, Zn, Sn or Mn and finally coated with a catalytic metal. This patent did not teach ruthenium on free MgO on an alumina washcoated cordierite base. The German patent did not teach the importance of there being free MgO available to which the ruthenium is bound, nor did it recognize the obstacles present in generating a stable MgO foundation, all problems overcome by the instant invention.

U.S. Pat. No. 3,784,675, Kobylinski et al, teaches a process for reducing the content of nitrogen oxides in the exhaust gases from internal combustion engines. The catalyst used is ruthenium on a refractory oxide. From 0.0001g to 0.1g of Ru per gram refractory oxide may be used. The patent discloses that the ruthenium can also be mounted directly to the surface of a ceramic support material or the ceramic support can first be coated with a refractory oxide prior to the deposition of ruthenium or the ruthenium can be combined with the refractory oxide and the resultant combination can then be deposited on the ceramic material. The addition of a refractory oxide coat is recommended so as to generate sufficient surface area for catalytic metal attachment. This patent teaches a simple compound system which comprises Ru on refractory oxide with both on a ceramic.

U.S. Pat. No. 3,809,743, Unland et al, teaches a process for treating automotive exhaust. The process utilizes a ruthenium catalyst for the reduction of $NO_x$ contaminants. The catalyst generally comprises from 1 to 0.001 wt. % Ru dispersed on an inorganic oxide support. In a preferred embodiment a monolithic core is coated with a washcoat of alumina which is then coated with a layer of ruthenium applied via an aqueous impregnation. This patent teaches a simple compound system which comprises Ru on refractory oxide with both on a ceramic. Experiments run in the course of developing the instant invention demonstrate that a simple compound ruthenium catalyst is very susceptible to volatilization or sintering under oxidizing conditions (Table I).

TABLE I

| Sample No. | Catalyst System | Treatment | % $NO_x$ Conversion at 0.8% $O_2$ |
|---|---|---|---|
| 1 | 0.03 Wt.% Ru/$Al_2O_3$/core | Fresh | 97.9 |
| 2 | 0.03 wt.% Ru/$Al_2O_3$/core | 6 hr at 850° C Air/Water | 38 |
| 3 | 0.03 wt.% Ru/$Al_2O_3$/core | 16 hr at 700° C Cycled | 61 |

From this Table it can readily be seen that a simple compound catalyst system is not functional in its formally disclosed embodiment. It is obvious that the simple compound catalyst is not readily adaptable for use in systems wherein major fluctuations in operating condition from rich to lean conditions is a continuous occurrence.

U.S. Pat. No. 3,835,069, Gandhe et al, teaches a ruthenium catalyst system. In practicing this invention, a ceramic core is washcoated with alumina. Ruthenium and alkaline earth metal oxides or rare earth metal oxides are then pre-reacted to form a ruthenate and the ruthenate is deposited on the washcoated ceramic, dried and calcined. Alternatively, the ruthenate is slurried with α-alumina and the slurry is deposited on the support, dried and calcined.

Studies were made just using MgO powder as the catalytic support medium. MgO powder coated with Ru tested under severe temperature conditions (900° C) showed no ruthenium loss. At first glance, it would appear as if merely coating a support with MgO and in turn coating this system with Ru would yield the ideal catalyst system. This was not found to be the case.

Since for a system to be operable high surface area is needed, no attempt was made to put MgO in the low surface area core. Magnesium oxide on a low surface area core would slake and lose the necessary high surface area. Cores are pretreated with $Al_2O_3$ so as to generate a high surface area and produce a material which, upon the deposit of MgO will have sufficient surface area to effectively hold the catalyst metal (Ru) in a well dispersed and active state. The $Al_2O_3$ has a surface area of from 10–200 $m^2/gm$ of washcoat.

To overcome the disadvantage of MgO slaking, resort was taken to a supported support system consisting of a monolith core plus $Al_2O_3/MgO/Ru$. The unique discovery of this invention is that when utilizing a supported support ($MgO/Al_2O_3$ mixed oxide), the two deleterious secondary phenomena of Ru loss or of slaking when using $Al_2O_3$ alone or MgO alone, respectively, can be overcome. That is, under high temperature operating conditions at which $Al_2O_3$ easily loses Ru to the atmosphere, and MgO, while retaining Ru, badly slakes and/or forms $Mg(OH)_2$ and desurfaces, a system utilizing a core coated and reacted with $Al_2O_3$ then coated and reacted with MgO and finally coated with catalytic quantities of Ru produces a desirable catalyst for $NO_x$ reduction stable up to a temperature of 850° C. The Ru does not volatilize from the MgO and the placing of MgO on $Al_2O_3$ support reduces the slaking and hydroxide formation problems.

The instant invention relates to high surface area multilayer mixed oxide supports and ruthenium-coated supported multilayer mixed oxide materials in which a high surface area refractory oxide material is bonded to a monolithic structure which is in turn coated and reacted with a layer of MgO applied to a critical wt. % loading level so as to insure at least 2 wt. % "free" MgO (determined by X-ray analysis). The three-component mixed oxide system is then coated with ruthenium by means of a nonaqueous procedure which produces a catalyst of desired properties. The instant invention further relates to methods of preparing the multilayer mixed oxide supports and ruthenium-coated multilayer mixed oxide catalysts.

Ruthenium-coated multilayer mixed oxide supports are useful as catalytic nitric oxide reducing agents. This unique system is characterized by high mechanical strength, high activity, pronounced activity retention and marked resistance to ruthenium volatilization up to a temperature of 850° C.

The multilayered mixed oxide support of the instant invention consists of cordierite cores coated with a high surface area refractory oxide such as $Al_2O_3$ to a loading level of between 4–20 wt. %, preferably about 10 wt. %. These coated cores are then coated with MgO by either dipping the cores into molten $Mg(NO_3)_2 \cdot 6H_2O$ and calcining or by dipping the cores in an aqueous solution of $Mg(NO_3)_2 \cdot 6H_2O$ and calcining, or by combinations of the two methods. These steps are repeated until from 2 to 15 wt. % MgO, as free MgO, preferably 3.8 to 6 wt. %, is deposited on the core as determinable by X-ray diffraction examination. To insure a minimum of at least 2 wt. % free MgO, about 5.1 wt. % MgO based on total weight of $Al_2O_3$ plus core, must be deposited and reacted with the $Al_2O_3$ and a part of the core. The term "free" MgO will be defined below. Free MgO constitutes the anchor to which the ruthenium-coat bonds. Ruthenium in the form of its salts is uniformly distributed onto the MgO treated core via immersion in a dilute nonaqueous solution of a ruthenium salt. The preferred method of application is acetone adsorption. The treated core is then subjected to calcining and/or reduction prior to use. From between 0.00001–0.3 wt. %, preferably 0.005–0.05 wt. % ruthenium is present on the catalyst after calcining and/or reduction.

Magnesium oxide applied in a conventional solution manner below a critical amount to $Al_2O_3$ washcoated cordierite monoliths reacts with the washcoat and the core at high temperatures (these reactions will be described below) with the result that no free MgO is present to stabilize the ruthenium. The presence of at least 2 wt. % free MgO is essential for there to be bonding of ruthenium to the support since it is known that ruthenium on MgO alone is quite stable and resists volatilization and sintering at high temperatures (up to 850° C) in an oxidizing atmosphere. Strongly bound MgO on the $Al_2O_3$ coated core prevents slaking of the MgO component. The presence of anchored free MgO stabilizes Ru and therefore affords a chemically stable system possesing desirable $NO_x$ reduction characteristics.

Experiments to determine how much "free" MgO was on a given core after a high temperature treatment were carried out. A series of 10 wt. % high surface area (10–200 $m^2/gm$ of washcoat) $Al_2O_3$ washcoated cores heat treated at either 600° C or 1000° C in air were impregnated with magnesium nitrate by placing them in an aqueous magnesium nitrate solution. The magnesium impregnated $Al_2O_3$ were dried and then calcined at 600° C. This process was repeated several times for the heavier loadings of MgO. The cores were then impregnated with ruthenium. In all cases a nominal Ru loading of 0.03 wt. % was placed on the cores. The cores were then reduced at 600° C in $H_2/Ar$ for one hour and durability treated at 850° C in air/water for 16 hours. After the durability treatment, the cores were analyzed for both Ru and "free" MgO. Ru was determined by X-ray Fluorescense (XRF) and MgO was determined by first leaching the ground core in warm 1N HCl for 16 hours. This solution was then analyzed by atomic absorption for the amount of Mg present. The results are shown in Table II.

It can be seen that there is essentially no Ru retained after the durability treatment until there is 3.8 wt. % leachable MgO or more. This indicates that the MgO leached out at the lower level of MgO loadings in Table II may not be there as pure or "free" MgO which is required to stabilize the Ru to volatilization loss. Nevertheless, the more MgO which is put on the core, the more absolutely remains as free MgO and thus is able to stabilize Ru. The last point to be made from Table II is that presintering the $Al_2O_3$ washcoated core does not appear to cut down the reactivity of the MgO toward the washcoat or core.

TABLE II

| Core Treatment | Wt % MgO | Treatment | Wt % MgO After* Treatment | Wt % Ru After Treatment |
|---|---|---|---|---|
| 600° C/Air | 0.6 | None | 0.6 | 0.024 Ru |
| 600° C/Air | 0.6 | 850° C/16 hr | 0.46 | 0.006 Ru |
| 600° C/Air | 2.0 | None | 2.0 | 0.019 |
| 600° C/Air | 2.0 | 850° C/16 hr | 1.4 | 0.003 |
| 1000° C/Air | 3.6 | None | 3.6 | 0.021 |
| 1000° C/Air | 3.6 | 850° C/16 hr | 2.2 | 0.008 |
| 600° C/Air | 7.6 | None | 7.6 | 0.020 |
| 600° C/Air | 7.6 | 850° C/16 hr | 3.8 | 0.017 |

*Amount of MgO leached from catalyst by 1N HCl for 16 hr and normalized to initial wt % MgO.

Experiments consisting of adding MgO in the form of molten magnesium nitrate hexahydrate to a crushed cordierite monolith were performed. This powder was dried at 150° C and then fired in air at 850° C for 1 hour. The sample was X-rayed and then mixed with more magnesium nitrate, dried and fired. This process was repeated nine times resulting in the last sample containing 15.3 wt. % MgO. The phases which were observed as a function of wt. % MgO is shown in Table III. It should be noted that the core is composed of approximately 95–98 wt. % cordierite, with a mullite ($Al_6Si_2O_{13}$) second phase.

TABLE III

REACTIONS BETWEEN MAGNESIUM NITRATE AND CORDIERITE MONOLITH at 850° C FOR ONE HOUR

| Wt % MgO As $MgO(NO_3)_2.6H_2O$ | Phases Observed With X-Rays | | | | |
|---|---|---|---|---|---|
| | Mullite | Cordierite | Spinel | Forsterite | Magnesia |
| 0 | X | X | | | |
| 1.5 | X | X | X | | |
| 3.5 | X | X | X | | |
| 5.1 | | X | X | | X |
| 6.1 | | X | X | | X |
| 8.2 | | X | X | | X |
| 10.1 | | X | X | | X |
| 11.7 | | X | X | | X |
| 13.4 | | X | X | X | X |
| 15.3 | | X | X | X | X |

It is seen that as MgO is added it reacts with the $Al_2O_3$ washcoat and mullite. As more MgO is added, instead of MgO and cordierite reacting to form spinel and forsterite ($Mg_2SiO_4$), one observes free MgO in the X-ray pattern. This continues and the MgO X-ray lines grow until about 13 wt. % MgO has been added at which time forsterite appears. As more MgO is added, the cordierite X-ray lines decrease and the spinel and magnesium oxide X-ray lines increase. This indicates that the cores must be prereacted with MgO to saturate the core and only after this can one get "free" Mgo. This wt. % MgO necessary to saturate the core will, of course, depend to a great extent on the time and temperature of exposure. The longer the calcination and the higher the temperature, the greater the amount of MgO that will be needed to saturate the core and in turn permit "free" Mgo to remain on the surface. Such condition of temperature and time of exposure are within the purview of those skilled in the art now that the basic concept of the necessity of there being free MgO has been revealed. Techniques for the determination of the presence of free MgO also are within the area of those skilled in the art.

The amount of free MgO which exists in the system can be readily determined from comparison of the data in the tables. From Table III it can be seen that when 5.1% MgO (based upon wt. of $Al_2O_3$ and core) as $Mg(NO_3)_2.6H_2O$ is on the core and is treated at 850° C for 1 hour, X-ray observation detects the presence of magnesia (free MgO). From this it can be determined that at 5.1 wt. % MgO about 2 wt. % free MgO is on the system since those familiar with X-ray determination will recognize that about 2% of a material is needed for an X-ray pattern to appear.

No free MgO is detected until 5.1 wt. % is deposited At a load level of 3.5, no free MgO is seen.

Table II demonstrated another detection technique. When 7.6% by wt. MgO is on a core, after a 16 hr. treatment at 800° C about 3.8 wt. % MgO is detected by 1N HCl leaching.

This is in good agreement with the data of Table III since clearly 7.6 minus 3.8 (leachable) equals 3.8 wt. % MgO to saturate cores which is within experimental error agreement with the 3.5% taught by Table III.

Therefore, it can be stated that to produce a functioning catalyst with sufficient free MgO to bind the ruthenium, enough MgO must be added so that after reaction a detectable X-ray pattern for free MgO can be decerned or alternatively, at least 3.5 wt. % must be added to saturate the core, any excess going to free MgO. Based upon mechanical consideration an upper level of 15 wt. % free MgO may be deposited on the catalyst system since at around this loading level one encounters the onset of mechanical breakdown, i.e., slaking and/or spalling (peeling). From Table II one can calculate the preferred upper limit of free MgO. When 9.6 wt. % MgO is deposited, if 3.5 to 3.8 MgO is subtracted as that quantity needed to saturate the core, one gets 5.8–6.1 wt. % MgO as free MgO. To summarize, free MgO in the range of 2–15 wt. % may be deposited on the system, preferably 3.8–6%.

With the understanding of the concept of "free" MgO and the sequence and extent of reactions between $Mg(NO_3)_2.6H_2O$ and the cordierite monoliths, a series of experiments was carried out to determine how much MgO would be needed to stabilize the Ru on cores.

These experiments involved the reaction of 1 inch (2.54 cm) diameter by 3 inches (7.62 cm) long $Al_2O_3$ (10 wt. %) washcoated cores with various amounts of magnesium nitrate. The MgO content varied from 0.6 wt. % to 7.6 wt. % based on the total core weight as shown in Table IV. After drying at 120° C, the cores were typically calcined at 600° C in air, cooled in nitrogen to ambient temperature, and then impregnated using the adsorption of RuCl$_3$ from acetone to uniformly disperse the metal salt. The reduction temperature was 550° C for 1 hour in H$_2$/Ar following drying to remove the acetone solvent. All of the cores were durability treated at 850° C for 16 hours under wet air and then analyzed for Ru by XRF.

The results of these experiments are shown in Table IV. It can be seen that the general trend is one which shows more Ru retention with greater MgO loadings. This is what would be expected since the quantity of "free" MgO increases with loading. It is the quantity of "free" MgO which is responsible for Ru stabilization. Also it will be noted that in no case was Ru completely retained as found in the case of MgO powders. The reason for this lies in the fact that during the adsorption of ruthenium chloride from acetone solution by the multilayered mixed oxide support, one gets adsorption on both MgO and other exposed surfaces such as unreacted Al$_2$O$_3$, spinel and cordierite. When the core is calcined at 850° C all or a fraction of the Ru on surfaces other than free MgO are lost via oxidative volatilization. The net result then is somewhat less than 100% Ru retention.

TABLE IV

RUTHENIUM RETENTION DATA FOR VARIOUS DURABILITY TREATED MONOLITHS

| Nominal Composition (wt. %) | Treatment | Wt. % Ru Retained | % Ru Retained |
|---|---|---|---|
| 0.024% Ru 0.06% MgO 10% Al$_2$O$_3$ | 850° C/16 hr Air/Water | 0.006 | 25 |
| 0.036% Ru 1.1% MgO 5% Al$_2$O$_3$ | 850° C/16 hr Air/Water | 0.006 | 16 |
| 0.019% Ru 2.0% MgO 10% Al$_2$O$_3$ | 850° C/16 hr Air/Water | 0.003 | 16 |
| 0.030% Ru 2.4% MgO 5% Al$_2$O$_3$ | 850° C/16 hr Air/Water | 0.007 | 23 |
| 0.021% Ru 3.6% MgO 10% Al$_2$O$_3$ | 850° C/16 hr Air/Water | 0.008 | 38 |
| 0.033% Ru 6.7% MgO 10% Al$_2$O$_3$ | 850° C/16 hr Air/Water | 0.014 | 42 |
| 0.02% Ru 7.6% MgO 10% Al$_2$O$_3$ | 850° C/16 hr | 0.017 | 85 |

The MgO/Al$_2$O$_3$ honeycomb "supported structure" system is prepared by contacting the honeycomb, prewashcoated with high surface area (~175 m$^2$/gm of washcoat) Al$_2$O$_3$ which had been calcined in flowing air at 600° C for 16 hrs. with a solution of 25.6 g Mg(NO$_3$)$_2$·6H$_2$O dissolved in 20 cc of H$_2$O. A typical core containing ca. 10% by wt. of alumina washcoat had an uptake of the Mg(NO$_3$)$_2$·6H$_2$O solution of about 4.5 g of solution upon contacting the solution with the honeycomb structure by pouring the solution through the channels of the honeycomb structure. (The honeycomb structure itself was a cylinder 1 in. in diameter by 3 in. in length with about 200 cells/sq. in.) The excess liquid held by capillary action in the honeycomb cells was removed by blotting the excess solution. Then the honeycomb was dried at 120° C for 3 hrs. before calcination at 600° C for 3 hours. At that time, the cores were transferred to the N$_2$ purged port of a dry box to cool under a flow of nitrogen. The honeycomb at ambient temperature was then transferred to a dry box and contacted typically with 40 cc acetone solution containing ca. 6 mg ruthenium as the ruthenium chloride salt to give 0.03 wt. % Ru on the total core weight basis. The contacting of the acetone solution with the dehydrated core was carried out with the minimum excess solution contacting the outside area of the core surface to enhance uniform distribution of ruthenium in the interior of the honeycomb. The solution was allowed to contact the honeycomb for 16 hours whereupon adsorption of ruthenium chloride from solution onto the honeycomb was observed to occur. Acetone was removed by flowing N$_2$ gas over the honeycomb inside the dry box. The cores were weighed to ensure complete removal of acetone. The core was then transferred to a tube furnace with minimum contact with the air and was then reduced at 550° C for 2 hours with 15% H$_2$/Ar.

| Ruthenium concentration range | | |
|---|---|---|
| 0.00001% | - | 0.3% |
| 0.005% | - | 0.1% preferred |
| 0.005% | - | 0.05% most preferred |

Having discovered that greater than 5.1 wt. % MgO based on the weight of Al$_2$O$_3$ is needed on an Al$_2$O$_3$ (10 wt. %) coated core to get the minimum wt. % free MgO needed to stabilize most of the Ru to volatilization, the following method has been used to make prototype catalysts for testing.

Figure 1:
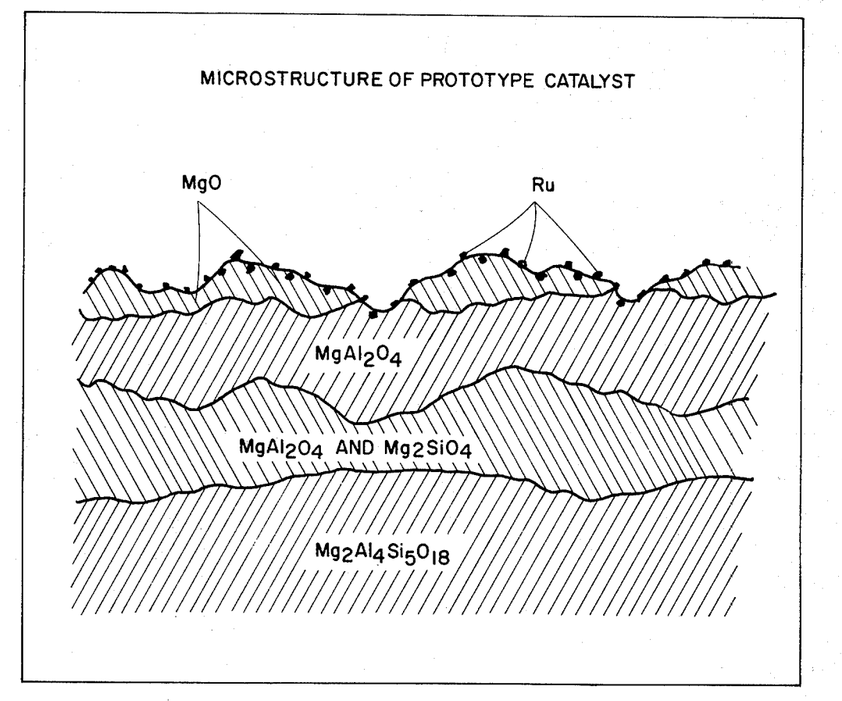

A typical catalyst is produced by starting with a 10 wt. % Al$_2$O$_3$ washcoated cordierite monolith (3.75 inches [9.52 cm] dia. × 4.5 inches [11.43 cm] long). This core is calcined at 600° C for one hour, cooled and removed to a dry box employing a N$_2$ atmosphere. The MgO is placed on the core by dipping the core into molten magnesium nitrate at at least 90° C. This core is then calcined for several hours at 900° C under air to induce extensive reaction between the MgO and the Al$_2$O$_3$ coating and monolith. This results in about 5.5 to 6 wt. % MgO pickup on the core and creates a "reaction layer" on the core itself of forsterite and spinel (see FIG. 1). Also, this molten salt dip converts the Al$_2$O$_3$ washcoat to spinel. After the 900° C air calcination, the core is treated with a room temperature saturated aqueous solution of magnesium nitrate. After this second magnesium impregnation, the core is typically calcined at 600° C for one hour. This gives an additional 2–3% of MgO on the core, resulting in a total of 7.5 to 9 wt. % MgO. The Ru salt is deposited on the core in a N$_2$ dry box from an acetone-ruthenium chloride solution. The core was allowed to adsorb the Ru from the solution for 16 hours and then reduced in H$_2$/Ar at 550° C for one hour.

The resulting BET surface area of the support and dispersion of the metal are shown in Table V. When prepared as described above, the surface area of the 600° C calcined core was 100 m$^2$/gm of MgO. However, when other calcining temperatures were used after the saturated solution dip, the resulting surface area is decreased. The metal dispersion was determined only for the 1000° C calcined core since it was felt that this core, with the lowest BET surface area, would give the poorest metal dispersion. The cores prepared by a 600° C calcination were assumed to have 80% metal dispersion or better.

TABLE V

SURFACE AREA AND METAL DISPERSION OF PROTOTYPE CATALYSTS

| Composition (wt.%) | Treatment given to Support Before Metal Impregnation | Surface Area (sq. m) | Surface Area (sq. m/gm MgO) | Metal Dispersion (%) |
|---|---|---|---|---|
| 0.04% Ru 7.8% MgO 10% Al$_2$O$_3$ | 600° C/1 hr Air/Water | 7.8 | 100 | — |
| 0.04% Ru 8.4% MgO 10% Al$_2$O$_3$ | 800° C/1 hr Air/Water | 6.6 | 78 | — |
| 0.04% Ru 8.1% MgO 10% Al$_2$O$_3$ | 1000° C/1 hr Air/Water | 4.7 | 58 | 80 |

Alternatively, the uncoated monoliths can be reacted with the magnesium nitrate and then washcoated with Al$_2$O$_3$, instead of putting the 10 wt. % Al$_2$O$_3$ washcoat on the core and then carrying out the molten salt treatment. This core would then be further reacted with a small amount of MgO to convert the Al$_2$O$_3$ to MgAl$_2$O$_4$ and deposit "free" MgO on the surface.

Numerous experiments directed solely at improving the durability of a MgO "supported support" catalyst with "free" MgO as the Ru stabilizing component on the honeycomb support have been conducted. These are reported in Table VI. The results will be discussed in turn under specific subsection headings to aid the logical evaluation of the catalyst results.

Fresh Catalyst Activity

The reaction temperature required to produce 50% NO$_x$ conversion was found to be directly dependent upon the active ruthenium loading level. For fresh catalysts with 0.03 wt. % ruthenium the 50% NO$_x$ conversion temperature was found to be between 260°–275° C. As expected, the 50% NO$_x$ conversion temperature of three high surface area catalysts (1.47% MgO/Al$_2$O$_3$, 1.12% MgO/Al$_2$O$_3$ and 2.45% MgO/Al$_2$O$_3$ prepared by Mg(NO$_3$)$_2$ impregnation and calcination with the wt. % MgO based on total core weight) were 275° C 275° C and 265° C, respectively, following a 700° C reduction. The fresh activities of the honeycomb catalysts with much higher MgO loading levels (ca. 12%) which were explicitly prepared to saturate the acidic nature of the Al$_2$O$_3$ washcoat and the cordierite honeycomb, have fresh activities comparable to the above catalysts. This result is remarkable since the washcoating surface area is significantly decreased by the preparative conditions employed to saturate the washcoat and the core with MgO thereby producing "free" MgO.

TABLE VI

| Catalyst (Wt. %) | Durability Treatment | Reduction Temp. (with A/F 13.0 Blend or 15% H$_2$/Ar) | Temperature of 50% NO$_x$ Conversion |
|---|---|---|---|
| 0.03% Ru/1.12% MgO/Al$_2$O$_3$/H.C. | None | 500° C | 275° C |
| 0.03% Ru/1.12% MgO/Al$_2$O$_3$/H.C. | None | 700° C | 265° C |
| 0.03% Ru/2.45% MgO/Al$_2$O$_3$/H.C. | None | 500° C | 275° C |
| 0.03% Ru/2.45% MgO/Al$_2$O$_3$/H.C. | None | 700° C | 265° C |
| 0.03% Ru/1.12% MgO/Al$_2$O$_3$/H.C. | 600° C, Air-H$_2$O 17 hrs. | 500° C | 280° C |
| 0.03% Ru/1.12% MgO/Al$_2$O$_3$/H.C. | 600° C, Air-H$_2$O 17 hrs. | 700° C | 280° C |
| 0.03% Ru/2.45% MgO/Al$_2$O$_3$/H.C. | 600° C, Air-H$_2$O 17 hrs. | 500° C | 290° C |
| 0.03% Ru/2.45% MgO/Al$_2$O$_3$/H.C. | 600° C, Air-H$_2$O 17 hrs. | 700° C | 280° C |
| 0.03% Ru/1.12% MgO$_2$/Al$_2$O$_3$/H.C. | 700° C, Air-H$_2$O 17 hrs. | 500° C | Not Activated |
| 0.03% Ru/1.12% MgO$_2$/Al$_2$O$_3$/H.C. | 700° C, Air-H$_2$O 17 hrs. | 700° C | 320° C |
| 0.03% Ru/2.45% MgO/Al$_2$O$_3$/H.C. | 700° C, Air-H$_2$O 17 hrs. | 500° C | Not Activated |
| 0.03% Ru/2.45% MgO/Al$_2$O$_3$/H.C. | 700° C, Air-H$_2$O 17 hrs. | 700° C | 315° C |
| 0.03% Ru/1.12% MgO/Al$_2$O$_3$/H.C. | 850° C, Air-H$_2$O 17 hrs. | 500° C | Not Activated |
| 0.03% Ru/1.12% MgO/Al$_2$O$_3$/H.C. | 850° C, Air-H$_2$O 17 hrs. | 700° C | 325° C |
| 0.03% Ru/2.45% MgO/Al$_2$O$_3$/H.C. | 850° C, Air-H$_2$O 17 hrs. | 500° C | Not Activated |
| 0.03% Ru/2.45% MgO/Al$_2$O$_3$/H.C. | 850° C, Air-H$_2$O 17 hrs. | 700° C | Not Activated |
| 0.03% Ru/2.45% MgO/Al$_2$O$_3$/H.C. | 850° C, Air-H$_2$O 17 hrs. | 800° C | Not Activated |
| 0.03% Ru/2.45% MgO/Al$_2$O$_3$/H.C. | 850° C, Air-H$_2$O 17 hrs. | 900° C | 345° C |
| 0.03% Ru/2.0% MgO/Al$_2$O$_3$/H.C. | 850° C, Air-H$_2$O 17 hrs. | 500° C | Not Activated |
| 0.03% Ru/2.0% MgO/Al$_2$O$_3$/H.C. | 850° C, Air-H$_2$O 17 hrs. | 700° C | Not Activated |
| 0.03% Ru/7.6% MgO/Al$_2$O$_3$/H.C.[1] | None | 500° C | ca. 300° C |
| 0.03% Ru/7.6% MgO/Al$_2$O$_3$/H.C. | None | 700° C | 275° C |
| 0.03% Ru/7.6% MgO/Al$_2$O$_3$/H.C. | 850° C, Air-H$_2$O 17 hrs. | 500° C | 345° C |
| 0.03% Ru/7.6% MgO/Al$_2$O$_3$/H.C. | 850° C, Air-H$_2$O 17 hrs. | 700° C | 300° C |
| 0.03% Ru/12.3% MgO/Al$_2$O$_3$/H.C.[2] | None | 500° C | 270° C |

TABLE VI-continued

| Catalyst (Wt. %) | Durability Treatment | Reduction Temp. (with A/F 13.0 Blend or 15% H$_2$/Ar) | Temperature of 50% NO$_x$ Conversion |
|---|---|---|---|
| 0.03% Ru/12.3% MgO/Al$_2$O$_3$/H.C. | None | 700° C | 260° C |
| 0.03% Ru/12.3% MgO/Al$_2$O$_3$/H.C. | 850° C, Air-H$_2$O 17 hrs. | 500° C | Not Activated |
| 0.03% Ru/12.3% MgO/Al$_2$O$_3$/H.C. | 850° C, Air-H$_2$O 17 hrs. | 700° C | 325° C |
| 0.03% Ru/12.3% MgO/Al$_2$O$_3$/H.C. | 850° C, Air-H$_2$O 17 hrs. | 850° C | 285° C |
| 0.03% Ru/6.7% MgO/Al$_2$O$_3$/H.C. | None | 500° C | 270° C |
| 0.03% Ru/6.7% MgO/Al$_2$O$_3$/H.C. | None | 700° C | 265° C |
| 0.03% Ru/6.7% MgO/Al$_2$O$_3$/H.C. | 850° C, Air-H$_2$O 17 hrs. | 500° C | Not Activated |
| 0.03% Ru/6.7% MgO/Al$_2$O$_3$/H.C. | 850° C, Air-H$_2$O 17 hrs. | 700° C | 275° C |

[1]Four separate Mg(NO$_3$)$_2$.6H$_2$O pseudo-incipient wetness impregnations followed by drying at 150° C and calcination at 850° C.
[2]Eight separate Mg(NO$_3$)$_2$.6H$_2$O pseudo-incipient wetness impregnations followed by drying at 150° C and calcination at 850° C following each drying except for last firing at 600° C.

However, it is apparent from the 50% NO$_x$ break temperatures at the bottom of Table VI that an approach to a stable catalyst was achieved with a number of preparative procedures where extremely high MgO levels were employed. The catalyst with 7.6% MgO obtained by four separate Mg(NO$_3$)$_2$.6H$_2$O impregnations followed by 850° C calcinations had good durability with a 50% NO$_x$ conversion temperature of 300° C, only about 25° C higher than the fresh catalyst. An analogous catalyst with 12.3% MgO prepared by eight sequential impregnation had a sluggish activation behavior but nevertheless had a 50% NO$_x$ conversion temperature of 285° C after an 850° C reduction treatment. Another analogous catalyst prepared by three sequential impregnations but on alumina precalcined at 1000° C was intermediate in NO$_x$ conversion with a 310° C break temperature. The best result was obtained with a catalyst prepared by first contacting the core with molten Mg(NO$_3$)$_2$.6H$_2$O followed by calcination and then contacting with a saturated Mg(NO$_3$)$_2$ solution. The total MgO loading level of this catalyst was 6.7 wt. %. There was only a 10° C increase in the 50% NO$_x$ conversion temperature from 265° C to 275° C following the standard 850° C, 17 hour, air-H$_2$O durability treatment for this catalyst.

Experiments were conducted to determine the usefulness of the material as catalysts under actual working conditions after exposure to the rigors of realistic on line use. The experiments are as follows:

1. Laboratory tests at 1200° F using synthetic exhaust gas and 1 inch dia. × 1 inch long catalyst samples; 2. constant load engine dynamometer tests using two 3.75 inches dia. × 4.5 inches long samples where the fuel to one bank of cylinder is clear and the fuel to the other had 500 ppm S and 0.07 gm Pb/gal; and 3. automobile testing using two 3.75 inches dia. × 4.5 inches long samples in conjunction with two oxidation catalysts.

Laboratory Tests

The catalysts which were prepared and tested are shown in Table VII. The first seven cores tested give, as expected, good fresh conversion. These results show a well dispersed catalyst can be made with 1. low Al$_2$O$_3$ content (5 wt. %), 2. 1000° C presintered Al$_2$O$_3$ cores, and 3. high loading levels of MgO (greater than 7 wt. %).

TABLE VII

| Composition | Treatment | Run No. | % NO$_x$ Conversion 0% O$_2$ | 0.8% O$_2$ |
|---|---|---|---|---|
| 0.03 wt. % Ru 2 wt. % MgO 10 wt. % Al$_2$O$_3$[1] | H$_2$ reduced at 650° C for 2 hrs. | 1 | 97 | 97 |
| | | 2 | 97 | 95.5 |
| 0.03 wt. % Ru 1.5 wt. % MgO 5 wt. % Spinel | H$_2$ reduced at 650° C for 1½ hrs. | 1 | 98 | 97 |
| | | 2 | 97 | 86.3 |
| 0.03 wt. % Ru 2.4 wt. % MgO 5 wt. % Al$_2$O$_3$ | H$_2$ reduced at 650° C for 1½ hrs. | 1 | 96 | 95.4 |
| | | 2 | 96 | 93.7 |
| 0.03 wt. % Ru 1.1 wt. % MgO 5 wt. % Al$_2$O$_3$ | H$_2$ reduced at 650° C for 1½ hrs. | 1 | 96.2 | 94.2 |
| | | 2 | 95.5 | 93.5 |
| 0.019 wt. % Ru 1.5 wt. % MgO[2] 10 wt. % Al$_2$O$_3$ | H$_2$ reduced at 650° C for 2 hrs. | 1 | 98.3 | 98.3 |
| 0.02 wt. % Ru 7.6 wt. % MgO[3] 10 wt. % Al$_2$O$_3$ | H$_2$ reduced at 650° C for 2 hrs. | 1 | 98.4 | 98.4 |
| 0.03 wt. % Ru 2 wt. % MgO 10 wt. % Al$_2$O$_3$[1] | H$_2$ reduced at 650° C for 2 hrs. | 1 | 97 | 97 |
| | | 2 | 97 | 95.5 |
| 0.03 wt. % Ru 2.4 wt. % MgO 5 wt. % Al$_2$O$_3$ | H$_2$ reduced at 650° C for 1½ hrs. | 1 | 96 | 95.4 |
| | | 2 | 96 | 93.7 |
| 0.03 wt. % Ru 1.1 wt. % MgO 5 wt. % Al$_2$O$_3$ | H$_2$ reduced at 650° C for 1½ hrs. | 1 | 96.2 | 94.2 |
| | | 2 | 95.5 | 93.5 |
| 0.019 wt. % Ru 1.5 wt. % MgO[2] 10 wt. % Al$_2$O$_3$ | H$_2$ reduced at 650° C for 2 hrs. | 1 | 98.3 | 98.3 |
| 0.02 wt. % Ru | H$_2$ reduced at | 1 | 98.4 | 98.4 |

TABLE VII-continued

| Composition | Treatment | Run No. | % NO$_x$ Conversion 0% O$_2$ | 0.8% O$_2$ |
|---|---|---|---|---|
| 7.6 wt. % MgO[3] 10 wt. % Al$_2$O$_3$ | 650° C for 2 hrs. | | | |
| 0.021 wt. % Ru ≈4 wt. % MgO 10 wt. % Al$_2$O$_3$[1] | H$_2$ reduced at 650° C for 2 hrs. | 1 | 97.8 | 97.7 |
| 0.021 wt. % Ru ≈4 wt. % MgO 10 wt. % Al$_2$O$_3$ | Air calcined at 870° C for 6½ hrs. | 1 | 98.8 | 20.3 |
| 0.032 wt. % Ru 12.3 wt. % MgO[3] 10 wt. % Al$_2$O$_3$ | H$_2$ reduced at 650° C for 1½ hrs. | 1 | 98.4 | 78.4 |
| 0.032 wt. % Ru 12.3 wt. % MgO[3] 10 wt. % Al$_2$O$_3$ | Air calcined at 870° C for 6½ hrs. | 1 | 98.4 | 25.2 |
| 0.033 wt. % Ru 6.7 wt. % MgO[4] 10 wt. % Al$_2$O$_3$ | H$_2$ reduced at 650° C for 1½ hrs. | 1 | 98.4 | 97.6 |
| 0.033 wt. % Ru 6.7 wt. % MgO[4] 10 wt. % Al$_2$O$_3$ | Air calcined at 870° C for 6½ hrs. | 1 | 97.8 | 21.8 |

[1]Core was presintered at 1000° C before impregnation with MgO.
[2]Before the core was impregnated with a magnesium nitrate solution, it was pre-reacted with MgO powder.
[3]The MgO was put on the core from a saturated solution of magnesium nitrate in water at 22° C.
[4]The MgO was put on the core from a molten magnesium nitrate liquid.

Poison Tolerance Testing

The poison tolerance testing was carried out on two 3.75 inches dia. × 4.5 inches long cores in a constant load dynamometer. One bank of four cylinders of the V-8 engine was used to test the poison tolerance of a catalyst while the other bank was used as a control with clean fuel. This dynamometer was run at approximately the same conditions as the cycling dynamometer (catalyst temperature was 590° C and A/F = 14) except no air injection into the exhaust manifold was used. The fuel used for poison testing had 0.07 gm Pb/gal and 500 ppm S.

The results of the test are shown in Table VIII.

TABLE VIII

POISON TOLERANCE TEST ON RUTHENIUM CATALYSTS

| Composition (wt.%) | S and P in Fuel | Time | % O$_2$ in Exhaust | % Gross NO$_x$ Conversion | % Net NO$_x$ Conversion |
|---|---|---|---|---|---|
| 0.14% Ru 14.0% MgO 10% Al$_2$O$_3$ | 0.01 gm Pb/gal or less 20–40 ppm S | 0 | 0.4% | 95 | 85 |
| | | 225 hr at 50 mph | 0.4% | 40 | 35 |
| 0.04% Ru 16% MgO 10% Al$_2$O$_3$ | 0.07 gm Pb/gal 500 ppm S | 0 | 0.2% | 95 | 60 |
| | | 225 hr at 50 mph | 0.2% | 65 | 45 |

The clean side is slightly worse than the poisoned side which is due to the higher % O$_2$ in the exhaust. This test shows that the Ru catalyst is not poisoned in a major way by S and Pb.

Vehicle Testing of NO$_x$ Catalysts

The vehicle testing of NO$_x$ catalysts is carried out in a 1973 Chevrolet with a 350 CID V-8 engine. Two 3.75 dia. × 4.5 inches long catalysts are used, and are placed at the exit port of each exhaust manifold followed by a PTX oxidation catalyst with air injection.

The NO$_x$ emissions are measured using the 1975 Federal Test Procedure (3-Bag CVS Procedure) where CVS means Constant Volume Sample. It is important to note this test measures net NO$_x$ conversion because the vehicle is equipped with an oxidation catalyst which converts all the NH$_3$ produced by the reduction catalyst back to NO$_x$.

The durability treatment of the catalyst is done on the Mileage Accumulation Dynamometer (MAD) using a predetermined cycle called the AMA durability driving schedule (Automobile Manufacturers Association). This schedule is shown in Table IX. The most severe part of each cycle. (11 laps), as far as temperature and space velocity are concerned, is lap 11 during the two wide open throttle acceleration from zero to 70 MPH.

The results of the vehicle tests are shown in Table X. As can be seen, all the Ru catalysts with less than 6 wt. % MgO were very poor indeed as shown by the deactivation during the relatively mild FTP even before it was subjected to the AMA cycle on the MAD. When more MgO was added (Sample 2) the durability was improved as they did not deactivate substantially during the FTP but after 1000 miles of AMA durability treatment the catalyst was completely deactivated.

TABLE IX

AMA Schedule

| Lap (3.7 mi) | Lap Speed |
|---|---|
| 1 | 40 |
| 2 | 30 |
| 3 | 40 |
| 4 | 40 |
| 5 | 35 |
| 6 | 30 |
| 7 | 35 |
| 8 | 45 |

TABLE IX-continued

| Lap (3.7 mi) | AMA Schedule | Lap Speed |
|---|---|---|
| 9 | | 35 |
| 10 | | 55 |
| 11 | | 70 |

During each of the first 9 laps, the following procedure will be followed.
At 0.4 miles - Accelerate to Lap Speed Decelerate to 20
At 0.7 miles - Accelerate to Lap Speed Stop
At 1.3 miles - Accelerate to Lap Speed Decelerate to 20
At 1.9 miles - Accelerate to Lap Speed Decelerate to 20
At 2.2 miles - Accelerate to Lap Speed Stop
At 2.6 miles - Accelerate to Lap Speed Decelerate to 20
At 2.9 miles - Accelerate to Lap Speed Stop
At 3.3 miles - Accelerate to Lap Speed Decelerate to 20
At 3.7 miles - Start New Lap Stop
Lap 10 Constant Speed - 55 MPH - No Stops
Lap 11 Two Wide Open Throttle Accelerations to 70 MPH
Each Consuming Half a Lap

Chemical Analysis

In Table XI are all the chemical analyses which were done on the dynamometer and vehicle tested cores. The first result to note is that all the Ru remained on the core. The amount of Pb, S and Fe do not appear to be so high so as to poison the catalyst when one realizes that on the dynamometer a catalyst when exposed to 0.07 gm Pb/gal and 500 ppm S does not deactivate.

The air to fuel ratio is 14 and the engine makes 5.25 gm $NO_x$ per mile. The space velocity through the catalyst is nominally 100,000 hour$^{-1}$ at low speeds, but under the most severe condition of acceleration of the 1975 FTP the space velocity exceeds 200,000 hour$^{-1}$.

The average bulk temperature of the catalyst is 670° C with a low of 600° C and a high of 860° C. These temperatures are measured with a thermocouple housed in a 1/8 inch dia. stainless steel tube which is placed at the geometric center of the catalyst support. There is serious question about the meaning and importance of this temperature for several reasons. At the leading edge of the catalysts where most of the reduction occurs the bulk support is much hotter, up to several hundred ° C. Even more important is the temperature of the exhaust gas itself. R. Tabaczyuski et al, in Proc. Auto Engineering Congress, Detroit, Michigan, Jan. 10–14, 1972, Paper No. 720112 reports on the exhaust temperature of an engine with a compression ratio of 7 and running on an air-fuel ratio of 15. They show the peak temperature of the exhaust gas to be 1300° C with an average temperature of approximately 900° C. The metal catalyst particles are hotter than the surrounding gas so one sees that the surface catalyst particles are much hotter than the temperatures measured in the vehicle tests. A Ru/MgO/$Al_2O_3$ core catalyst stable to high temperature with extremely long life is possible if the volatilization, sintering and/or agglomeration of the catalyst metal can be prevented by control of the maximum surface temperature of the catalyst bed. Surface temperatures above 850° C must be avoided, since at such temperatures agglomeration of Ru is encountered.

TABLE X

| Sample No. | Nominal Composition | Treatment [1] | Emissions [2] |
|---|---|---|---|
| 1 | 0.04 wt. % Ru<br>2.5 wt. % MgO<br>10 wt. % $Al_2O_3$ | First FTP<br>Second FTP | 2.00 gm/mi<br>2.76 gm/mi |
| 2 | 0.04 wt. % Ru<br>9.5 wt. % MgO<br>10 wt. % $Al_2O_3$ | First FTP<br>Second FTP<br>Third FTP<br>Fourth FTP<br>Fifth FTP<br>1000 mi of AMA durability on the MAD | 1.67 gm/mi<br>2.15 gm/mi<br>2.37 gm/mi<br>2.49 gm/mi<br>2.35 gm/mi<br>5.1 gm/mi |
| 3 | Front Edge PTX<br>0.04 wt. % Ru<br>22.8 wt. % MgO<br>10 wt % $Al_2O_3$ | First FTP<br>After 1000 mi of AMA durability on the MAD | 1.68 gm/mi<br>4.0 gm/mi |

[1] See Table IX which describes the AMA conditions.
[2] Base vehicle with a PTX-IIB oxidation catalyst produces 5.24 gm $NO_x$/mile as measured by the FTP.

TABLE XI

| Sample No.[1] | Nominal Composition | Treatment | XRF Composition[1] (wt. %) | | | |
|---|---|---|---|---|---|---|
| | | | Ru | Fe | Pb | S |
| 1 | 0.04 wt. % Ru<br>2.5 wt. % MgO<br>10 wt. % $Al_2O_3$ | 2-FTP's<br>Car 100 | 0.045<br>0.039<br>0.044<br>0.044<br>0.047<br>0.043 | 0.013<br>0.011<br>0.012<br>0.011<br>0.011<br>0.011 | 0.011<br>0.004<br>0.002<br>0.003<br>0.002<br>0.001 | 0.01<br>—<br>—<br>—<br>—<br>— |
| 2 | 0.04 wt. % Ru<br>9.5 wt. % MgO<br>10 wt. % $Al_2O_3$ | 1000 miles of AMA durability on MAD | 0.033<br>0.033<br>0.033<br>0.034<br>0.041<br>0.049 | —<br>—<br>—<br>—<br>—<br>— | 0.038<br>0.016<br>0.013<br>0.010<br>0.007<br>0.006 | —<br>—<br>—<br>—<br>—<br>— |
| 3 | 0.04 wt. % Ru<br>9.6 wt. % MgO<br>10 wt. % $Al_2O_3$ | 1000 miles of AMA durability on MAD | 0.035<br>0.033<br>0.033<br>0.033<br>0.031<br>0.038 | —<br>—<br>—<br>—<br>—<br>— | 0.025<br>0.016<br>0.014<br>0.009<br>0.008<br>0.007 | —<br>—<br>—<br>—<br>—<br>— |

[1] The composition is given for various sections of the core and are listed gas inlet end first.

What is claimed is:
1. A catalyst, resistant to ruthenium volatilization and resistant to agglomeration to 850° C in air, com- prising ruthenium deposited on and bonded to a layer of free MgO, the MgO being deposited on and reacted with a 10–200 m²/g surface area alumina washcoated cordierite monolith core to the extent necessary to yield a MgAl$_2$O$_4$ spinel and Mg$_2$SiO$_4$ forsterite layer supporting the reactive layer of free MgO, the high surface area alumina being initially washcoated on the cordierite monolith core and calcined so as to react with said core giving a stable foundation.

2. The catalyst of claim 1 wherein between 4–20 wt. % (based on total core wt.) alumina is on the cordierite cores; between 2–15 wt. % free magnesium oxide is left on the reacted alumina washcoated monolith and between 0.00001 to 0.3% by weight ruthenium is on the free magnesium oxide.

3. The catalyst of claim 2 wherein the alumina is present based on total core weight at 10 wt. %, the free magnesium oxide is present at between 3.8–6 wt. % and the ruthenium is present at between 0.005 to 0.05 wt. %.

4. A method for preparing multilayer supported support ruthenium catalysts resistant to ruthenium volatilization and resistant to ruthenium agglomeration to a temperature of 850° C comprising the steps of impregnating an alumina washcoated monolithic core with magnesium nitrate, drying the magnesium nitrate coated structure, calcining the magnesium nitrate coated structure to produce at least 2 wt. % free MgO, contacting the free MgO coated core with a solution of ruthenium salt, reducing the ruthenium salt to elemental ruthenium.

5. The method of claim 4 wherein the impregnating with magnesium nitrate is a multistep process which comprises dipping an alumina washcoated monolithic core into molten magnesium nitrate, calcining the impregnated core, dipping this calcined core into an aqueous saturated solution of magnesium nitrate, calcining the aqueous dipped core.

6. The method of claim 5 wherein the coating of the free MgO coated core with ruthenium comprises contacting the free MgO coated core with a nonaqueous ruthenium chloride solution, adsorbing ruthenium salt onto the free MgO from the solution, reducing the ruthenium salt on the free MgO to elemental ruthenium.

7. The method of claim 6 wherein the nonaqueous ruthenium chloride solution is an acetone-ruthenium chloride solution.

8. The method of claim 4 wherein the calcining of the molten magnesium nitrate treated core is conducted at 900° C; the calcining of the aqueous magnesium nitrate treated core is conducted at 600° C; the contacting of the free MgO coated core with the acetone-ruthenium salt solution proceeds for 16 hours and the reducing of the ruthenium salt to elemental ruthenium occurs in H$_2$/Ar at 550° C for 1 hour.

9. The method of claim 8 wherein the molten magnesium nitrate is maintained at at least 90° C during the impregnation and the aqueous saturated solution of magnesium nitrate is maintained at room temperature.

* * * * *